United States Patent [19]

Brown

[11] Patent Number: 4,737,577
[45] Date of Patent: Apr. 12, 1988

[54] METHOD FOR REMOVING MONOMER FROM AN ACRYLATE ADHESIVE BY REACTION WITH A SCAVENGER MONOMER

[75] Inventor: Francis W. Brown, St. Paul, Minn.

[73] Assignee: Minnesota Mining and Manufacturing Company, St. Paul, Minn.

[21] Appl. No.: 948,242

[22] Filed: Dec. 31, 1986

[51] Int. Cl.$^4$ ................................................ C08F 6/10
[52] U.S. Cl. ................................. 528/501; 526/328.5; 526/329.5; 526/329.6; 525/228; 525/229; 525/309
[58] Field of Search ...................... 525/228, 229, 309; 526/931, 319, 328.5, 329.5, 329.6; 524/801

[56] References Cited

U.S. PATENT DOCUMENTS

| | | | |
|---|---|---|---|
| 4,185,050 | 1/1980 | Lazear et al. | 525/221 |
| 4,476,262 | 10/1984 | Chu et al. | 523/412 |
| 4,510,298 | 4/1985 | Lindsey et al. | 526/87 |
| 4,529,753 | 7/1985 | Taylor | 523/328 |

*Primary Examiner*—Joseph L. Schofer
*Assistant Examiner*—Angela L. Fugo
*Attorney, Agent, or Firm*—Donald M. Sell; James A. Smith; Richard Francis

[57] ABSTRACT

An improvement in acrylate polymer pressure sensitive adhesive compositions consists of using a reactive scavenging monomer to remove objectionable residual monomer by copolymerization to form a non-objectionable copolymer.

8 Claims, No Drawings

METHOD FOR REMOVING MONOMER FROM AN ACRYLATE ADHESIVE BY REACTION WITH A SCAVENGER MONOMER

TECHNICAL FIELD

The invention relates to acrylate polymer pressure sensitive adhesive (PSA) compositions. Most specifically, the invention relates to the reduction of the level of residual objectionable monomer from such acrylate polymer adhesives.

BACKGROUND OF THE INVENTION

The commercial success of pressure-sensitive adhesive (PSA) tapes which utilize acrylate or acrylic polymer or copolymer adhesives as the viscoelastic adhesive layer is well known. Ulrich, U.S. Pat. No. Re. 24,906, discloses acrylate polymer adhesives which have the well-known critical four-fold balance of physical properties needed for a successful PSA composition, vis-a-vis, adhesion, cohesion, stretch and adhesive tack. Despite the commercial success of acrylate polymer PSA, residual monomer in the final polymerized product is a problem which has been for the most part been tolerated. In today's market, the criteria for various products which include such adhesive compositions have been raised for many applications to a point where conventional residual monomer levels have become unacceptable.

Copolymers of isooctyl acrylate or other high boiling acrylates with acrylic acid or acrylamide are representative PSA compositions which have monomer residue. Residues of such monomers are unwanted mainly because they give off unpleasant odors. Although polymerizations can be carried to extremes where conversions of monomer starting materials (hereafter referred to as primary monomer) to copolymer are well above 95%, it is almost impossible to eliminate all unreacted primary monomer during the initial reaction. And, such unreacted primary monomers are not easily removed by volatilization because of their low volatility.

The following prior art reveals various known methods of dealing with residual monomer:

Taylor, U.S. Pat. No. 4,529,753, teaches a process of treating an emulsion of one or more monomers, at least 80 weight percent of which have been polymerized, to reduce residual monomer in the resultant polymer. The process involves subjecting the emulsion to temperature and pressure conditions at which the vapor pressure of the water in the ambient environment is less than the vapor pressure of the water in the emulsion and introducing into the emulsion a free readical generator until the residual monomer content is reduced.

Chu et al., U.S. Pat. No. 4,476,262, disclose a process for preparing an aqueous dispersion composition which includes a water dispersible ionic polymer component and an addition polymer to have reduced amounts of extractable undesirable residue monomer that is used to prepare the addition polymer. The undesired monomer residue is reduced by conducting an additional polymerization step in the presence of addition polymer containing residual monomer with another monomer which is capable of copolymerizing with the undesired monomer and which results in a less undesirable monomer residue or a residue which is more easily removable. The ionic polymers are preferably based on epoxy resin.

Lindsey et al., U.S. Pat. No. 4,510,298, disclose a process for reducing residual toxic isocyanate monomer left after the polymerization is completed. The process is accomplished by use of a scavenger near the end of the polymerization reaction. The scavenger, an active polymerization monomer (preferably butyl acrylate), is added in an amount at least equal to the isocyanate monomer when at least 98% of the isocyanate monomer has been polymerized. Butyl acrylate is recognized by Chu et al. ('262) as giving off an objectionable odor. While the use of butyl acrylate may remove residual toxic isocyanate monomer, it could leave the polymer with an undesirable odor.

No disclosure is known of employing a scavenger to reduce undesirable monomer in acrylate polymer PSA compositions. Even if such a process modification were suspected of being useful for the production of acrylate polymer PSA composition, by its nature it includes the production of a copolymer of a scavenger monomer and unwanted residual monomer which could have an adverse effect upon the critical four-fold balance of physical properties needed for a successful acrylate PSA composition.

SUMMARY OF THE INVENTION

It has been discovered, quite surprisingly, that certain scavenger monomers may be employed to reduce the undesirable residual primary monomer content of acrylate PSA compositions, without an adverse effect upon the critical four-fold balance of physical properties needed for a successful acrylate PSA composition. In the present invention, scavenger monomers, such as vinyl acetate, vinyl butyl ether, or methyl acrylate, preferentially react with residual unreacted acrylate monomers, such as isooctyl acrylate, 2-ethylhexyl acrylate and butyl acrylate, to reduce to an acceptable level the residual primary acrylate monomer content. An acrylate polymer PSA is prepared by polymerizing primary monomers to provide substantially complete (i.e., at least about 80%) conversion where the viscoelastic properties satisfy PSA requirements and then a scavenger monomer is added to copolymerize with the residual primary monomers. The level of residual primary monomer is thus lowered to an acceptable level.

The present invention involves improvement in a method of making a normally tacky, pressure sensitive acrylate polymer adhesive involving polymerizing at least one primary monomer which typically fails to completely react and thereby leaves unwanted residual monomer in the acrylate polymer. The improvement comprises reacting the residual monomer or monomers, after the polymerizing is substantially complete, with a scavenger monomer which is wanted or removable and is reactive with the residual monomer to form a copolymer of the scavenger monomer and the residual monomer. The amount of scavenger monomer is selected to be in excess of that sufficient to react substantially all of the residual monomer. The method may also include the step of removing unreacted scavenger monomer. Preferably, scavenger monomer is more volatile than the residual primary monomers and the removal is by volatilization.

It should be noted that the role of the monomer which is utilized as the scavenger differs considerably from that when it is utilized as a comonomer such as would be the case if such a comonomer were added at the beginning of the polymerization. While it may be possible to reduce the level of residual primary monomer by additions of large amounts of such comonomer at the beginning of copolymerization, such additions have an adverse effect of the resultant pressure-sensitive adhesive composition for many uses.

When used as a comonomer as opposed to a scavenger, vinyl acetate increases the glass transition temperature ($T_g$) of the adhesive, making the adhesive stiff and less compliant. Such vinyl acetate copolymer adhesives have high shear but exhibit "slip-stick" behavior (undergoing an uneven release rate during peeling, causing an undesirable jerking) at high peel rates. Such adhesives are called "shocky". Such adhesives also exhibit poor "quick-stick" or immediate adhesion to a substrate. Shockiness and poor quick-stick are undesirable for many general purpose PSA coated tape applications where quick and light finger pressure are conventionally used for applying the tape to a substrate.

The preferred scavenger is a monomer compound having a general formula selected from the group consisting of:
(a) $H_2C=CH-O-R$ wherein R is a $C_1-C_8$ alkyl group, preferably methyl, ethyl, or propyl;
(b)

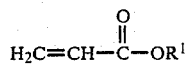

wherein $R^1$ methyl or ethyl; and
(c)

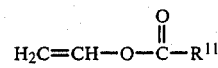

wherein $R^{11}$ is methyl, ethyl, or propyl.

The method produces a normally tacky, pressure sensitive adhesive composition comprising
(1) acrylate polymer comprised of at least one primary acrylate monomer which typically fails to completely react and thereby leaves unwanted residual monomer in the polymer, and
(2) a copolymer of said unwanted residual primary monomer and a scavenger monomer,
wherein the amount of the residual monomer in the adhesive composition is lower than it would be if the scavenger monomer were added to the primary acrylate monomer at the beginning of the polymerization of the primary acrylate monomer in the preparation of the acrylate polymer, while substantially maintaining the same adhesive properties in the resultant composition as they would be in a pressure sensitive adhesive composition made of the same primary monomer under the same conditions but without use of a scavenger monomer.

The primary acrylate monomer is typically a $C_4-C_{12}$ acrylic ester such as isooctyl acrylate, 2-ethylhexyl acrylate, 2-methyl butyl acrylate, or butyl acrylate. The scavenger monomer is preferably selected from the group consisting of vinyl acetate, vinyl butyl ether, and methyl acrylate, most preferably vinyl acetate for residual monomer such as isooctyl acrylate.

The PSA compositions of this invention generally comprise a blend of the following components:
a. An acrylate (or methacrylate) copolymer having an inherent viscosity greater than about 0.2 dl/g comprising polymerized primary monomers and optionally polar comonomer. The primary monomer is at least one free radically polymerizable vinyl monomer which is an acrylic or methacrylic acid ester of a non-tertiary alcohol having from 1 to 18 carbon atoms with the average number of carbon atoms being about 4-12. The polar monomer is copolymerizable with the primary monomer and the amount by weight of polar monomer is up to about 30% of the total weight of all monomers in the copolymer. Other monomers may also be included.
b. Up to about 150 parts by weight of a compatible tackifying resin per 100 parts by weight copolymer.
c. Up to about 50 parts by weight of a compatible plasticizer per 100 parts by weight copolymer, and
d. Copolymer of the primary monomer and a scavenger monomer.

In addition to the above-described PSA composition, this invention also provides coated sheet material comprising a backing member and a PSA coating (comprising the PSA composition of this invention) covering at least a portion of one major surface thereof. Specific products comprising the coated sheet material, namely, a roll of tape and a transfer tape, are provided as well. The roll of tape comprises a flexible backing sheet having at least one major surface coated with the PSA of this invention, and the transfer tape comprises a film of the PSA composition on at least one release liner.

DETAILED DESCRIPTION OF THE INVENTION

The primary monomer or monomers of the above-defined acrylate (or methacrylate) polymer are chosen such that a tacky or tackifiable material is obtained upon polymerization. Representative examples of primary monomers which may be used in combination are the acrylic or methacrylic acid esters of non-tertiary alcohols such as methanol, ethanol, 1-propanol, 2-propanol, 1-butanol, 2-methyl-1-propanol, 1-pentanol, 2-pentanol, 3-pentanol, 2-methyl-1-butanol, 3-methyl-1-butanol, 2-hexanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 4,5-dimethyl-1-hexanol, 3,4-dimethyl-1-hexanol, 3 methyl-1-heptanol, 5-methyl-1-heptanol, 3,5,5-trimethyl-1-hexanol, 1-decanol, 1-dodecanol, 1-hexadecanol, 1-octadecanol, and the like. Such monomers are known in the art, and many are commercially available.

The polar monomers suitable for use in accordance with this invention are those having hydroxyl, amide, or carboxylic, sulfonic, or phosphonic acid functionality. Representative examples are acrylamide, methacrylamide, N-vinyl-2-pyrrolidone, 2-hydroxyethylacrylate, 2-hydroxyethylmethacrylate, hydroxypropylacrylate, acrylic acid, methacrylic acid, itaconic acid, maleic acid, fumaric acid, vinyl benzoic acid, 2-carboxyethylacrylate, 2-sulfoethylmethacrylate, and 4-vinyl phenyl phosphonic acid. Preferred polar monomers are acrylic acid, acrylamide and N-vinyl-2-pyrrolidone. The amount by weight of polar monomer preferably does not exceed about 30% of the total weight of all monomers, such that excessive PSA firmness is avoided. Incorporation of polar monomer to the extent of about 1% to about 15% by weight is most preferred.

The acrylic or methacrylic copolymer may include other monomers besides the primary and polar monomers in quantities which do not render the composition non-tacky to improve performance, reduce cost, or for other purposes. Examples of such other monomers include vinyl esters, vinyl chloride, vinylidene chloride, styrene, macromolecular monomers such as monoacrylic functional polystyrene and polydimethylsiloxane, and the like.

The copolymerization of the primary and polar monomers is by conventional free radical polymerization such as described by Ulrich, U.S. Pat. No. Re. 24,906. The monomers are dissolved in an inert organic solvent and polymerized utilizing a suitable free radical initiator which can be either thermally or photochemically activated. Suitable thermally activated initiators include azo compounds such as 2,2'-azobis(isobutyronitrile), hydroperoxides such as tert-butyl hydroperoxide, and peroxides such as benzoyl peroxide. Suitable photochemically activated initiators include benzoin ethyl ether and 2,2-dimethoxy-2-phenyl acetophenone. The amount of initiator used is generally about 0.01% to about 5% by weight of the total polymerizable composition.

The organic solvent used in the free radical copolymerization can be any organic liquid which is inert to the reactants and product and which will not otherwise adversely affect the reaction. Suitable solvents include ethyl acetate and mixtures such as ethyl acetate with toluene or isopropyl alcohol. Other solvents systems are useful. The amount of solvent is generally about 30–70% by weight of the total weight of reactants and solvent. In addition to solution polymerization, the copolymerization can be carried out by other well-known techniques such as suspension, emulsion and bulk polymerization.

Polymerization of primary monomer and polar monomer, if used, is effected with substantially complete conversion of the primary and polar monomers so as to provide acrylate (or methacrylate) copolymer. Such copolymerization is usually accomplished within about 20 hours, preferably about 10 hours or less. While such copolymerization is substantially complete, it typically leaves unreacted residual primary monomer levels on the order of 1% to 5%, as determined by gas chromatography, based upon the weight of the initial monomer charge. It has been discovered that reduction of residual primary monomer levels may be accomplished by subsequent polymerization with a scavenger monomer to form a copolymer of the residual primary monomers and scavenger monomer. Such subsequent copolymerization has been found to reduce the residual primary monomer level to less than about 0.25% based upon the initial weight of the monomer charge. The scavenger monomer may be added by any conventional means at levels and reaction conditions which do not significantly alter the PSA properties. Preferably, the scavenger is added when the primary monomer has reached at least about 80% conversion to an acrylate copolymer, typically at the level of about 5% to about 25% by weight scavenger monomer, based upon the weight of the initial monomer charge.

Following copolymerization, the resultant acrylate or methacrylate copolymer may, when necessary or desirable, be blended with a compatible tackifying resin and/or plasticizer in order to optimize the ultimate tack and peel properties of the PSA composition. The use of such tack-modifiers is common in the art, as is described in the *Handbook of Pressure-Sensitive Adhesive Technology* edited by Donatas Satas (1982). Examples of useful tackifying resins include rosin, rosin derivatives, hydrogenated rosin derivatives, polyterpene resins, phenolic resins, coumarone-indene resins, and the like. Plasticizers which can be employed include the well-known extender oils (aromatic, paraffinic, or naphthenic), as well as a wide variety of liquid polymers. When used, tackifying resin is preferably added in an amount not to exceed about 150 parts by weight per 100 parts by weight copolymer, and plasticizer may be added in an amount up to about 50 parts by weight per 100 parts by weight copolymer.

It is also within the scope of this invention to include various other components in the adhesive formulation. For example, it may be desirable to include such materials as pigments, fillers, stabilizers, medicaments, or various polymeric additives.

The PSA compositions of this invention are easily coated upon suitable flexible or inflexible backing materials by conventional coating techniques to produce PSA-coated sheet materials. The flexible backing may be of any material which is conventionally utilized as a tape backing or may be of any other flexible material. Representative examples of flexible tape backing materials include paper, plastic films such as poly(propylene), poly(ethylene), poly(vinyl chloride), polyester [e.g., poly(ethylene terephthalate)], cellulose acetate, and ethyl cellulose. Backings may also be of woven fabric formed of threads of synthetic or natural materials such as cotton, nylon, rayon, glass, or ceramic material, or they may be of a nonwoven fabric such as air-laid webs of natural or synthetic fibers or blends of these. In addition, the backing may be formed of metal, metallized polymeric film, or ceramic sheet material. The PSA-coated sheet materials may take the form of any article conventionally known to be utilized with PSA compositions such as labels, tapes, signs, covers, marking indices, and the like.

The PSA composition may also be coated as films on a suitable release liner to provide an adhesive transfer film.

The PSA compositions of this invention may be coated by any of a variety of conventional coating techniques such as roll coating, knife coating, or curtain coating. The PSA compositions may also be coated without modification by extrusion, coextrusion, or hot melt techniques by employing suitable conventional coating devices for this purpose. Primers may be used, but they are not always necessary. The resultant coatings do not require curing or crosslinking. However, if enhancement of resistance to solvents, etc., is desired, crosslinking may be effected by standard methods well-known in the art, such as radiation curing (electron beam or ultraviolet light) or chemical crosslinking.

EXAMPLES

The invention is further illustrated by the following examples, in which all parts are by weight unless otherwise stated.

Test Methods

One of the test methods used to determine that the resultant PSA compositions have adequate PSA properties is the "Peel Adhesion Test for Single Coated Pressure-Sensitive Tapes, 180° Angle". This test is identified as PSTC-1 by the Pressure Sensitive Council, 1800 Pickwick Ave., Glenview, Ill. Pressure Sensitive Tapes are tested in a variety of ways while being subjected to different kinds of stress. For all applications, the overriding physical property which qualifies the tape is its adhesion performance.

Preparation of Sample for Adhesion Test

The copolymer solutions taken from the bottle reactors of the test examples were knife coated on 38 micrometer thick primed polyester film to a 25 micrometer dried coating thickness. The copolymer PSAS thus coated were immediately dried for ten minutes in a 65° C. oven followed by aging for about sixteen hours at 22° C. and 50% relative humidity prior to testing. The coated sheet thus prepared was ready for testing as follows under "Peel Adhesion Test".

Peel Adhesion Test

Peel adhesion is measured as the force required to remove a coated flexible sheet material from a test panel, measured at a specific angle and rate of removal. In the examples of this application the force is expressed in Newtons per 100 millimeters (N/100 mm) width of coated sheet. The details of this test are given in "Test Methods for Pressure Sensitive Tapes", Eighth Edition, Revised August 1980. The procedure is summarized as follows:

1. A 12.7 mm width of coated sheet is applied to the horizontal surface of a clean glass test plate with at least 12.7 lineal centimeters in firm contact. A 2 kg hard rubber roll is used to apply the strip.
2. The free end of the coated strip is doubled back nearly touching itself so the angle of removal is 180°. The free end is attached to the adhesion tester scale.
3. The glass test plate is attached to the table of an IMASS ™ adhesion testing machine manufactured by Instrumentors, Inc. which is capable of moving the table away from the scale at a constant rate of 2.3 meters per minute.
4. The force required for the removal is reported as an average of a range of numbers recorded by the testing apparatus. This value is reported as Newtons per 100 millimeters of width according to PSTC-1.

Shear Strength—Holding Power Test (PSTC No. 7—Eighth Edition—1985)

This test measures the time required to pull a PSA tape from a standard flat surface in a direction parallel to that surface under the stress of a standard, constant load. The value is expressed in units of time (minutes) per unit of area. It is a measure of the cohesive strength of the polymeric material. The conditions under which the examples in this application were measured follows:
1. Surface = stainless steel panel
2. Tape area = 12.7 mm by 12.7 mm
3. Panel angle = 178° *
4. Constant Load = 1 kilogram

* 2° less than 180° to negate any peel forces thereby insuring that only shear forces are measured.

PSTC No. 7 is found in "Test Methods", Pressure Sensitive Tape Council, 1800 Pickwick Ave., Glenview, Ill., 60025—August 1985.

Inherent Viscosity Measurement

The inherent viscosity of each adhesive composition was measured to provide a comparison of the molecular weight of each composition. The inherent viscosity is measured by conventional means using a Cannon-Fenske #50 viscometer in a water bath controlled at 27° C. to measure the flow time of 10 milliliters of a polymer solution (0.2 grams per deciliter of polymer in ethyl acetate solvent) and the flow time of the solvent.

Gas Chromatography

The detection of residual monomer at levels below 0.9 percent and as low as 0.01 percent which lie within the meaningful range of this invention, require an extremely sensitive detection method. These were determined by use of a Hewlett-Packard Model 5890 gas chromatograph, with the following:
Column: 15 meter capillary, J&W Scientific DB-1
Split: 80:1::Helium:Sample
Oven Temperature: 75° C. (isothermal)
Detector: Flame ionization (FID)
Injector Temperature: 250° C.
Detector Temperature: 300° C.
Sample Size: 3 microliters
Time of run: 15 minutes
Carrier Gas: Helium External standards of the residual monomer (e.g., isooctylacrylate, butylacrylate, etc.) to be detected, are prepared in vials (weight/weight;monomer/solvent). The concentrations of the monomer being tested are selected to bracket the range of unreacted monomer expected in polymer sample.

Example: at 95% conversion, the goal should be less than 2% unreacted monomer so standards should range from 0.1% to 0.5%.

The polymer samples taken from the solution polymerization reactor at varied degrees of conversion (usually after 90%) are diluted ten fold in a suitable solvent for ease of injection into the gas chromatograph port.

Where the external standards and the diluted polymer samples have been run successively under identical conditions, the area of the residual monomer peaks and the area of the external standard peaks are measured and the calculations are made to determine the percent of residual monomer in the polymer at the degree of conversion when the sample was taken.

EXAMPLES 1-4

(Preparation of PSA Copolymers)

A master solution of monomers was prepared by charging 152.28 parts of isooctylacrylate, 9.72 parts of acrylic acid, 0.486 part of 2,2'-azobis(isobutyronitrile) initiator (available under the trade designation VAZO 64 and hereinafter referred to as VAZO 64 ™ initiator) in a solvent blend of 128.7 parts of heptane and 69.3 parts of acetone. Five four ounce (about 120 ml) reactor bottles were each charged with 60 parts (grams) of master solution. The bottles were purged with nitrogen to eliminate oxygen, sealed and placed in a rotating water bath where they were tumbled for five (5) hours at 55° C. to effect about 80% conversion. At that point, one bottle was removed and analyzed to determine the amount of residual isooctylacrylate monomer. This was measured by gas chromatography and found to be 35.5% residual monomer based on initial monomer charged. The remaining four bottles received an additional 0.1% charge of VAZO 64 ™ initiator, based on the initial monomer charge. Example 1, the control, had no scavenger added. Examples 2, 3 and 4 received vinyl acetate monomer additions of 5%, 10% and 15%, respectively, based on the initial monomer charge. The four bottles were purged with nitrogen, sealed and placed in the water bath for an addition tumbling at 70° C. for nineteen (19) hours. The polymers were removed, analyzed for residual monomer, measured for inherent viscosity and coated on film backing to be tested of adhesive properties. The results are recorded in Table I.

The experiments conducted and reported as Examples 1 through 4 show that the initial residual amount of isooctylacrylate monomer was 35.5% after five hours of polymerization and that this amount was reduced after twenty four (24) hours of polymerization with vinyl acetate scavenger at levels of 5%, 10% and 15%.

EXAMPLES 5–9

(Preparation of PSA Copolymers)

These examples show the relative effectiveness of four different scavengers which were added at about 90 to 95% conversion of a 90 part isooctylacrylate 10 part acrylic acid copolymer pressure sensitive adhesive (PSA). The polymerization conditions were different than those used in Examples 1 through 4 in the following manner:

The master solution included 216 parts of isooctylacrylate, 24 parts of acrylic acid monomers, 0.48 part of VAZO 64 TM initiator and 360 parts of ethyl acetate solvent. To each of five four ounce (about 120 ml) reactor bottles was added 60 parts of the master solution. The reactor bottles were purged with nitrogen to eliminate oxygen then sealed and subjected to sixteen (16) hours of tumbling in a rotating water bath at 55° C. to effect about 90 to 95% conversion. At that point, the bottles were removed from the water bath, opened and an additional initiator charge of 2.4 parts of 1% solution of VAZO 64 TM in ethyl acetate was added. Examples 6–9 each were charged with a different scavenger (See Table I) at a 2.4 part by weight (PBW) level. The bottles were purged with nitrogen, sealed and placed in the rotating water bath at 60° C. for twenty (20) additional hours. The polymers were removed, analyzed, coated on film backing to measure adhesive properties. Results are recorded in Table I.

NON-WORKING EXAMPLES 10–14

(Preparation of PSA Copolymers)

These experiments show ineffective and unsuccessful removal of residual monomer in a 90 part isooctylacrylate/10 part acrylic acid copolymer when the scavenger does not have necessary reactivity to seek out and copolymerize with the unreacted residual monomer.

A master solution of 216 parts isooctylacrylate 24 parts acrylic acid monomers and 0.48 part of VAZO 64 TM initiator was charged with 360 parts of ethyl acetate solvent. To each of five four ounce (about 120 ml) bottles was added 60 parts of the master solution. After purging with nitrogen to remove oxygen, the bottles were sealed and tumbled for sixteen (16) hours at 55° C. in a rotating water bath to effect 90 to 95% conversion. Each bottle was opened and an additional 2.4 parts of 1% solution of VAZO 64 TM initiator in ethyl acetate was added. Exmple 10, the control, received no scavenger. Examples 11–14 each received 2.4 parts of a different scavenger (see Table I). The bottles were purged again with nitrogen then tumbled for twenty (20) additional hours at 60° C. in the water bath. Upon removal, the polymers were analyzed for residual monomer, measured for inherent viscosity and adhesion. The results are reported in Table I. Instead of a reduction in residual monomer, the amount of unreacted isooctylacrylate increased over the control (Example 10) which had no scavenger added.

EXAMPLES 15–19

(Preparation of PSA Copolymers)

These experiments show how scavengers selected according to the present invention can successfully remove the residual monomer from a 96 part isooctylacrylate/4 part acrylamide copolymer.

A master solution of 230.4 parts of isooctylacrylate, 9.6 parts of acrylamide, 0.48 part of VAZO 64 TM initiator and 360 parts of ethyl acetate solvent was prepared. Sixty (60) parts of the master solution were charged to each of five four ounce (about 120 ml) reactor bottles. The bottles were purged with nitrogen, sealed, placed in a rotating water bath where they tumbled for sixteen (16) hours at 55° C. to effect 90 to 95% conversion. The bottles were removed and opened. 2.4 parts of a 1% solution of VAZO 64 TM initiator in ethyl acetate were added to each bottle. Example 15, the control, received no scavenger. Examples 16–19 each received 2.4 parts of a different scavenger. The bottles were purged with nitrogen, sealed and returned to the water bath for an additional twenty (20) hours of polymerization. The polymers were removed, analyzed for residual monomer, measured for inherent viscosity and coated on film backing for adhesion testing. The results are reported in Table I.

The experiments demonstrate the effectiveness in lowering isooctylacrylate monomer when the polar monomer was acrylamide instead of acrylic acid.

NON-WORKING EXAMPLES 20–24

(Preparation of PSA Copolymers)

These experiments demonstrate in a 96 part isooctylacrylate/4 part acrylamide copolymer the problem associated with the selections of the wrong scavenger. A master solution of monomer was prepared by charging 230.4 parts of isooctylacrylate, 9.6 parts of acrylamide, 0.48 part of VAZO 64 TM initiator in 360 parts of ethyl acetate solvent. To each of five four ounce (about 120 ml) reactors bottle was charged 60 parts of the master solution. The bottles were purged with nitrogen, sealed, placed in a rotating water bath, then tumbled for sixteen (16) hours at 55° C. to effect 90 to 95% conversion. At this point the bottles were removed, and 2.4 parts of a 1% solution of VAZO 64 TM initiator added to each bottle. Example 20, the control, received no scavenger. Examples 21 and 24 each received 2.4 parts of a different scavenger (See Table I). Each bottle was purged with nitrogen, sealed and returned to the water bath for an additional twenty (20) hours at 60° C. The polymers were removed and analyzed for residual monomer, measured for inherent viscosity and adhesion properties. These results were reported in Table I.

These ineffective scavengers, which actually increase rather than decrease the amount of residual isooctylacrylate monomer, demonstrate that the appropriate choice of a scavenger is a critical feature of the invention.

EXAMPLES 25 and 26

(Preparation of PSA Copolymer)

These experiments involve a 2-ethyl hexyl acrylate homopolymer to which a vinyl acetate scavenger has been added at 90 to 95% conversion. 450 parts of 2-ethylhexyl acrylate monomer, 0.9 part of VAZO 64 TM initiator and 550 parts of ethyl acetate solvent make up the master solution. Aliquots (400 parts each) of this solution were added to two 32 ounce (about 1000 ml) reactor bottles. The bottles were purged with nitrogen, sealed and placed in a rotating water bath for sixteen (16) hours to effect a 90 to 95% conversion. The bottles were removed. Example 25, the control, received 0.1 part of additional VAZO 64 TM initiator. Example 26 received 0.1 part of VAZO 64 TM initiator and 10% vinyl acetate scavenger based on the weight of the initial monomer charge. The bottles were purged with nitrogen, sealed and returned to the water bath for an additional twelve (12) hours of tumbling at 65° C. The polymers were removed and then analyzed for residual monomer and measured for inherent viscosity.

The adhesion of these samples was not measured because they were too soft to be a true pressure sensitive adhesives. The vinyl acetate scavenger did successfully reduce the 2-ethyl hexyl acrylate residual monomers to an acceptable level in this non-PSA example.

EXAMPLES 27 and 28

(Preparation of PSA Copolymer)

This is an experiment where the principal polymer is a butyl acrylate homopolymer and a secondary copolymer results from reaction of the vinyl acetate scavenger with residual butyl acrylate monomer. Two four ounce (about 120 ml) reactor bottles were each charged with 18 parts of butyl acrylate monomer, 0.036 part of VAZO 64 TM initiator and 42 parts of ethyl acetate solvent. The bottles were purged with nitrogen, sealed and placed in a rotating water bath at 55° C. for sixteen (16) hours. The bottles were removed. Example 27, the control, received 1.8 part of a 1% solution of VAZO 64 TM initiator; Example 28 received the same amount of initiator plus 1.8 part of vinyl acetate scavenger. The bottles were purged again with nitrogen, sealed and returned to the water bath for twenty (20) additional hours of tumbling at 60° C. to effect 90 to 95% conversion. The polymers were then removed and analyzed for residual monomer and measured for inherent viscosity and adhesion. The results were reported in Table I.

This demonstrates in a PSA homopolymer the ability of a scavenger, such as vinyl acetate, to reduce butyl acrylate monomer residue.

EXAMPLES 29-31 and 35-37

(Scavenging with Vinyl Acetate)

A master solution was prepared by charging 151.2 parts IOA, 10.08 parts acrylic acid, 0.336 part VAZO 64 TM initiator and 252.0 parts ethyl acetate. A 60.05 part aliquot of the master solution was added to each of six 4-oz (about 120 ml) reaction bottles. Each bottle was purged with nitrogen to eliminate oxygen, sealed and placed in a rotating water bath at 55° C. for 10 hours. The bottles were removed from the water bath, opened and an additional 0.1% of VAZO 64 TM initiator (based on initial monomer charge) was added to each bottle. 10%, 20% and 30% VOAc scavenger, based on initial monomer charge, were added respectively to each of two of the bottles so that two sets of three bottles with 10%, 20% and 30%, respectively, VOAc scavenger resulted. The bottle were repurged, sealed, and placed in the rotating water bath at 60° C. One set containing 10%, 20% and 30% respectively, VOAc scavenger was removed after five hours at 60° C. The remaining set was removed after 10 hours at 60° C. The polymers were analyzed and coated on a film backing to measure adhesive properties. Results are recorded in TABLE III.

EXAMPLES 32-34 and 38-40

(Copolymerization with Vinyl Acetate)

Three master solutions of isooctyl acrylate/acrylic acid/vinyl acetate monomer in stoichiometric amounts to yield (84:6:10), (74:6:20) and (64:6:30) monomer ratios in the copolymers were prepared in ethyl acetate along with 0.2% VAZO 64 TM initiator based on initial monomer charge. A 60.05 part aliquot of each master solution was added to each of two 4-ounce (about 120 ml) reaction bottles so that two sets of polymers, each set having one each (84:6:10), (74:6:20) and (64:6:30) monomer ratio copolymer resulted. Each bottle was purged with nitrogen to eliminate oxygen, sealed and placed in a rotating water bath at 55° C. for 10 hours. The bottles were removed from the water bath, opened and an additional 0.1% VAZO 64 TM initiator based on initial monomer charge was added to each bottle. Each bottle was repurged, sealed, and placed in the rotating water bath at 60° C. One set of bottles containing (84:6:10), (74:6:20) and (64:6:30) monomer ratio copolymers was removed after 5 hours at 60° C. The remaining set was removed after 10 hours at 60° C. The polymers were analyzed and coated on a film backing to measure adhesive properties. Results are recorded in Table IV.

| Glossary of Terms used in Tables I and II |
|---|
| Primary Copolymer Monomers: |
| IOA = Isooctylacrylate |
| EHA = 2-ethylhexyl acrylate |
| BA = Butyl acrylate |
| AA = Acrylic acid |
| ACM = Acrylamide |
| Scavenger Monomers: |
| VOAC = Vinyl acetate |
| VBE = Vinyl n-butyl ether |
| VEHE = Vinyl 2-ethylhexyl ether |
| MA = Methyl acrylate |
| STY = Styrene |
| VP = 2-Vinyl pyridine |
| DBF = Dibutyl fumarate |
| MMA = Methyl methacrylate |
| Other Terms |
| PBW = Parts by Weight |

TABLE I (EXAMPLES ACCORDING TO THE INVENTION)

| | Initial Polymerization | Scavenger Type | PWB | I.V. (dl/g) | Adhesion (N/100 MM) | Residual[2] Monomer (%) |
|---|---|---|---|---|---|---|
| Ex. 1[3] | 94/6 | IOA/AA | None | 0 | 0.59 | 81 | 2.01 |
| Ex. 2 | 94/6 | IOA/AA | VOAC | 5 | 0.59 | 81 | 0.64 |
| Ex. 3 | 94/6 | IOA/AA | VOAC | 10 | 0.58 | 76 | <0.02 |
| Ex. 4 | 94/6 | IOA/AA | VOAC | 15 | 0.59 | 75 | <0.02 |
| Ex. 5[3] | 90/10 | IOA/AA | None | 0 | 1.42 | 66 | 1.61 |
| Ex. 6 | 90/10 | IOA/AA | VOAC | 10.0 | 1.56 | 69 | <0.04 |
| Ex. 7 | 90/10 | IOA/AA | MA | 10.0 | 1.50 | 71 | 0.64 |

TABLE I-continued (EXAMPLES ACCORDING TO THE INVENTION)

| | Initial Polymerization | Scavenger Type | PWB | I.V. (dl/g) | Adhesion (N/100 MM) | Residual[2] Monomer (%) |
|---|---|---|---|---|---|---|
| Ex. 8 | 90/10 IOA/AA | VBE | 10.0 | 1.77 | 85 | <0.04 |
| Ex. 9 | 90/10 IOA/AA | VEHE | 10.0 | 1.40 | 79 | 0.15 |
| Ex. 15[3] | 96/4 IOA/ACM | None | 0.0 | 1.31 | 69 | 1.00 |
| Ex. 16 | 96/4 IOA/ACM | VOAC | 10.0 | 1.38 | 79 | <0.04 |
| Ex. 17 | 96/4 IOA/ACM | MA | 10.0 | 1.36 | 66 | 0.49 |
| Ex. 18 | 96/4 IOA/ACM | VBE | 10.0 | 1.26 | 74 | <0.04 |
| Ex. 19 | 96/4 IOA/ACM | VEHE | 10.0 | 1.27 | 71 | <0.04 |
| Ex. 25[3] | 100 | EHA | None | 0.0 | 0.83 | — | 2.27 |
| Ex. 26 | 100 | EHA | VOAC | 10.0 | 0.88 | — | <0.11 |
| Ex. 27[3] | 100 | BA | None | 0.0 | 1.68 | 47 | 3.24 |
| Ex. 28 | 100 | BA | VOAC | 10.0 | 1.66 | 49 | 0.68 |

[1]The addition of Scavenger was at 90% to 95% conversion of the primary acrylate monomer, except for Example 1–4 which was at 80% conversion.
[2]Residual monomer based on weight of final copolymer.
[3]Control

TABLE II (NON-WORKING EXAMPLES)

| | Initial Polymerization | Scavenger Type | PWB | I.V. (dl/g) | Adhesion (N/100 MM) | Residual[2] Monomer (%) |
|---|---|---|---|---|---|---|
| Ex. 10[3] | 90/10 IOA/AA | None | 0.0 | 1.42 | 66 | 1.61 |
| Ex. 11 | 90/10 IOA/AA | STY | 10.0 | 1.17 | 66 | 4.03 |
| Ex. 12 | 90/10 IOA/AA | VP | 10.0 | 0.65 | 5 | 2.78 |
| Ex. 13 | 90/10 IOA/AA | DBF | 10.0 | 1.38 | 70 | 2.08 |
| Ex. 14 | 90/10 IOA/AA | MMA | 10.0 | 1.30 | 56 | 2.86 |
| Ex. 20[3] | 96/4 IOA/ACM | None | 0.0 | 1.31 | 69 | 1.00 |
| Ex. 21 | 96/4 IOA/ACM | STY | 10.0 | 1.28 | 70 | 3.22 |
| Ex. 22 | 96/4 IOA/ACM | VP | 10.0 | 1.30 | 76 | 2.64 |
| Ex. 23 | 96/4 IOA/ACM | DBF | 10.0 | 1.30 | 46 | 1.69 |
| Ex. 24 | 96/4 IOA/ACM | MMA | 10.0 | 1.23 | 56 | 1.69 |

[1]The addition of Scavenger was at 90% to 95% conversion of the primary acrylate monomer.
[2]Residual monomer based on weight of final copolymer.
[3]Control

TABLE III (POLYMERIZATION WITH VOAC SCAVENGER)

| Copolymer Monomer Ration Initial Polymerization | Polymerization Time Before VOAC (Hours) | VOAC (%) | Polymerization Time After VOAC Addition (Hours) | Total Polymerization Time (Hours) | Pressure Sensitive Adhesive | | | |
|---|---|---|---|---|---|---|---|---|
| | | | | | I.V. (dl/g) | Adhesion (N/100 MM) | Shear (Minutes) | Residual Monomer (%) |
| Ex. 29 IOA/AA 93.75/6.25 | 10 | 10 | 5 | 15 | 1.40 | 86 | 21.2 | 1.97 |
| Ex. 30 IOA/AA 93.75/6.25 | 10 | 20 | 5 | 15 | 1.46 | 87 | 27.2 | 1.83 |
| Ex. 31 IOA/AA 93.75/6.25 | 10 | 30 | 5 | 15 | 1.55 | 77 | 34.2 | 0.49 |
| Ex. 35 IOA/AA 93.75/6.25 | 10 | 10 | 10 | 20 | 1.41 | 87 | 23.0 | 0.81 |
| Ex. 36 IOA/AA 93.75/5.25 | 10 | 20 | 10 | 20 | 1.52 | 88 | 32.0 | <0.04 |
| Ex. 37 IOA/AA 93.75/6.25 | 10 | 30 | 10 | 20 | 1.57 | 63 | 119.5 | <0.03 |

TABLE IV (POLYMERIZATION WITH VOAC AS A COMONOMER INSTEAD OF AS A SCAVENGER)

| | Initial Charge IOA/AA/VOAC | Polymerization Hours | | | I.V. (dl/g) | Adhesion (N/100 MM) | Shear (Minutes) | Residual[1] Monomer (%) |
|---|---|---|---|---|---|---|---|---|
| | | Initial | Secondary | Total | | | | |
| Ex. 32 | 84/6/10 | 10 | 5 | 15 | 1.50 | 81 | 31.7 | 2.22 |
| Ex. 33 | 74/6/20 | 10 | 5 | 15 | 1.61 | 68 | 71.9 | 1.69 |
| Ex. 34 | 64/6/30 | 10 | 5 | 15 | 1.65 | 7–73 (shocky) | 179.1 | <0.04 |
| Ex. 38 | 84/6/10 | 10 | 10 | 20 | 1.53 | 80 | 35.2 | 0.79 |
| Ex. 39 | 74/6/20 | 10 | 10 | 20 | 1.63 | 76 | 80.8 | 0.12 |
| Ex. 40 | 64/4/30 | 10 | 10 | 20 | 1.57 | 17–64 (shocky) | 824.1 | <0.04 |

[1]Based on weight of final copolymer

Examples 29–31 and 35–37 were made for comparison with Examples 32–34 and 38–40 to compare properties of adhesives made using the scavenger technique versus traditional comonomer polymerization. In comparing the adhesion values for those two sets of adhesives one observes a more precipitous drop in peel adhesion to "shocky" behavior where VOAc is used as a comonomer. More rapid increase in shear strength holding power is observed with increasing levels of VOAc where VOAc is used as a comonomer and this is indicative also of high $T_g$ and a more "shocky" adhesive.

Where high levels of VOAc are used as a comonomer, low residual acrylate monomer is obtained; however, the adhesive exhibits the undesired "shocky" behavior.

EXAMPLE 41

(Preparation of Emulsion PSA Copolymer)

In this example, a control with no scavenger, the principal copolymer was isooctylacrylate (IOA)/acrylic acid (AA) polymerized in a waterborne (emulsion) system to show that residual IOA monomer (0.31%) was high enough to present a residue problem.

Isooctylacrylate monomer (380 parts), 20 parts of acrylic acid monomer, 0.32 part of carbon tetrabromide, 8 parts of sodium dodecyl benzene sulfonate and 498.7 parts of deionized water were charged to a two-liter split resin flask. The flask was equipped with a nitrogen inlet tube, a condenser, a thermowell and a means for agitation. The charged monomers were agitated at 350 revolutions per minute while being purged with nitrogen gas at 1 liter per minute and heated to a temperature of 29.4° C. At this point, 0.25 part of sodium metabisulfite ($Na_2S_2O_5$), 0.8 part of potassium persulfate ($K_2S_2O_8$) and 1.0 ml of a solution containing 0.22 parts ferrous sulfate heptahydrate ($Fe_2SO_4.7H_2O$) in 100 ml of deionized water were added to the flask. The polymerization inducted after twenty minutes and exothermed to 74° C. The polymerization was maintained at peak temperature (74° C.) for an hour before cooling and filtering. The inherent viscosity was measured in tetrahydrofuran at a concentration of 0.15 gram per deciliter, revealing an inherent viscosity of 1.38 dl/g. Gas chromatographic analysis found 0.31% residual, unreacted IOA monomer. Other samples of the polymer were coated and tested for peel adhesion (See Test Method) and found to have adhesion of 41 Newtons per 100 millimeters (N/100 mm) of width.

EXAMPLE 42

(Preparation of Emulsion PSA copolymer with 20 parts VOAc scavenger)

A polymerization identical to that used in Example 41 was run to the point where the peak temperature (74° C.) was reached. At that point, 20 parts of vinyl acetate (VOAc) scavenger were added. The polymerization was held at peak temperature for one hour before cooling and filtering. The inherent viscosity of the polymer measured in tetrahydrofuran at a concentration of 0.15 gram per deciliter was 1.49 dl/g. Gas chromatographic analysis revealed a residual IOA monomer level of less than 0.02%. Other samples of the polymer were coated and tested as a PSA Tape construction. The peel adhesion was found to be 38 Newtons per 100 millimeters (N/100 mm) of width.

Examples 41 and 42 clearly demonstrate that where required, the residual IOA monomer and its equivalent can be effectively reduced by means of the preferred scavenging monomers of this invention. Waterborne polymerization systems differ from solution polymerizations in the rate and degree of conversion of the monomeric charge to the desired degree of polymerization. When coated as a PSA the polymers are subjected to higher temperatures. Despite these differences, the effectiveness of the scavenging monomers of this invention is comparable to their effectiveness in solution polymerization techniques.

While this invention has been described in terms of specific embodiments, it should be understood that it is capable of further modifications. The claims herein are intended to cover those variations which one skilled in the art would recognize as the chemical equivalent of what has been described here.

We claim:

1. In a method of making a normally tacky, pressure sensitive acrylate polymer adhesive involving polymerizing at least one primary acrylate monomer selected from the the group consisting of isooctylacrylate, 2-ethylhexylacrylate, 2-methylbutyl acrylate and butyl acrylate, which typically fails to completely react and thereby leaves unwanted residual monomer in said acrylate polymer, the improvement comprising:

reacting said residual monomer, after said polmerizing is substantially complete, with a scavenger monomer wherein said scavenger monomer is selected from the group consisting of:

(a) $H_2C=CH-O-R$ wherein R is a $C_1-C_8$ alkyl group;

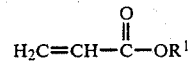

(b) wherein $R^1$ is methyl or ethyl; and

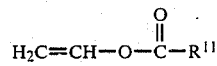

(c) wherein $R^{11}$ is methyl, ehtyl, or propyl and which is wanted or removable and is reactive with said residual monomer to form a copolymer of said scavenger monomer and said residual monomer with an amount of scavenger monomer which is in excess of that sufficient to react substantially all of said residual monomer to thereby reduce the residual monomer level without an adverse effect upon pressure sensitive adhesive physical properties.

2. The method of claim 1 wherein said scavenger monomer is removable and including the further step of removing unreacted scavenger monomer.

3. The method of claim 2 wherein said scavenger monomer is more volatile than said residual monomer and said removing is by volatilization.

4. The method of claim 1 wherein said scavenger monomer is $H_2C=CH-O-R$.

5. The method of claim 1 wherein said scavenger monomer is

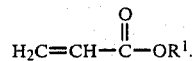

6. The method of claim I wherein said scavenger monomer is

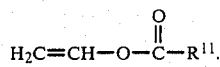

7. The method of claim 1 wherein said scavenger monomer is selected from the group consisting of vinyl acetate, vinyl butyl ether, and methyl acrylate.

8. The method of claim 5 wherein said residual monomer is isooctyl acrylate and said scavenger monomer is vinyl acetate.

* * * * *

UNITED STATES PATENT AND TRADEMARK OFFICE
CERTIFICATE OF CORRECTION

PATENT NO. : 4,737,577

DATED : April 12, 1988

INVENTOR(S) : Brown

It is certified that error appears in the above-identified patent and that said Letters Patent is hereby corrected as shown below:

On the first page of the patent at [75] after "Francis W. Brown, St. Paul, Minn." insert --Cheryl L. Moore, Afton, Minn.--

Signed and Sealed this

Ninth Day of May, 1989

Attest:

DONALD J. QUIGG

*Attesting Officer*  *Commissioner of Patents and Trademarks*